US009212041B2

(12) United States Patent
Keating et al.

(10) Patent No.: US 9,212,041 B2
(45) Date of Patent: Dec. 15, 2015

(54) WIRELESS CONTROL SYSTEM FOR DISPENSING BEVERAGES FROM A BOTTLE

(71) Applicant: Berg Company, LLC, Monona, WI (US)

(72) Inventors: Michael J. Keating, Hardwick, NJ (US); Donald R. Lamond, Haworth, NJ (US); Ronald F. Faust, Cross Plains, WI (US); Thomas E. Giles, Orfordville, WI (US); Albert H. Dorsey, Ocean Grove, NJ (US)

(73) Assignee: Berg Company, LLC, Monona, WI (US)

( * ) Notice: Subject to any disclaimer, the term of this patent is extended or adjusted under 35 U.S.C. 154(b) by 357 days.

(21) Appl. No.: 13/799,649

(22) Filed: Mar. 13, 2013

(65) Prior Publication Data

US 2014/0263399 A1 Sep. 18, 2014

(51) Int. Cl.
*B67B 7/00* (2006.01)
*G01F 11/00* (2006.01)
*B67D 3/00* (2006.01)

(52) U.S. Cl.
CPC ............ *B67D 3/0041* (2013.01); *B67D 3/0003* (2013.01); *B67D 3/0077* (2013.01)

(58) Field of Classification Search
CPC .... B67D 3/003; B67D 3/0041; B67D 3/0077; B67D 2001/0811; B67D 2210/00089; G01F 13/006; G01F 13/00
USPC ........ 222/1, 23; 700/231, 232, 239, 240, 281, 700/282; 340/603, 612
See application file for complete search history.

(56) References Cited

U.S. PATENT DOCUMENTS 2,554,570 A 5/1951 Harvey
3,920,149 A * 11/1975 Fortino et al. .................... 222/1

(Continued)

FOREIGN PATENT DOCUMENTS

CA 2668642 A1 5/2008
CN 101547856 A 9/2009

(Continued)

OTHER PUBLICATIONS

Nordic Semicnductor ASA; Specification Sheet for the nRF51422 System on Chip; website www.nordicsemi.com/eng/layout/set/print/products/ant/nRF51422.

(Continued)

*Primary Examiner* — J. Casimer Jacyna
*Assistant Examiner* — Benjamin R Shaw
(74) *Attorney, Agent, or Firm* — Whyte Hirschboeck Dudek S.C.

(57) ABSTRACT

A pour spout, for attaching to a bottle, has a first wireless transceiver and a valve for selectively controlling flow of a beverage from the bottle. A server interface, adapted to be carried by a person who serves beverages, has a second wireless transceiver. A control unit is provided to wirelessly communicate with the second transceiver. In one mode, the pour spout transmits a spout identifier to the server interface, which responds by transmitting the spout identifier and a server identifier to the control unit. The control unit responds with a reply transmission causing the server interface to command the pour spout to open the valve. In another mode, a person selects a cocktail, that results in the control unit sending designations of a plurality of liquor ingredients to the server interface. The server interface controls dispensing each of the plurality of liquor ingredients.

10 Claims, 5 Drawing Sheets

(56) References Cited

U.S. PATENT DOCUMENTS

| | | | | |
|---|---|---|---|---|
| 5,275,309 | A | 1/1994 | Baron et al. | |
| 5,379,916 | A * | 1/1995 | Martindale et al. | 222/1 |
| 5,505,349 | A | 4/1996 | Peckels | |
| 5,507,411 | A | 4/1996 | Peckels | |
| 5,567,131 | A | 10/1996 | McNaull | |
| 5,603,430 | A | 2/1997 | Loehrke et al. | |
| 5,702,032 | A * | 12/1997 | Loehrke | 222/63 |
| 5,731,981 | A * | 3/1998 | Simard | 700/239 |
| 5,839,483 | A | 11/1998 | Rejret et al. | |
| 6,321,934 | B1 | 11/2001 | Immel | |
| 6,328,277 | B1 | 12/2001 | Hanada | |
| 6,354,468 | B1 * | 3/2002 | Riek | 222/129.3 |
| 7,004,358 | B2 | 2/2006 | Ogawa | |
| 7,651,015 | B2 | 1/2010 | Girard et al. | |
| 8,196,781 | B2 | 6/2012 | Greenwald et al. | |
| 2005/0197738 | A1 | 9/2005 | Morrison et al. | |
| 2008/0195251 | A1 * | 8/2008 | Milner | 700/237 |
| 2009/0306818 | A1 * | 12/2009 | Slagley et al. | 700/232 |
| 2010/0038378 | A1 | 2/2010 | Gabler et al. | |
| 2011/0166699 | A1 * | 7/2011 | Palmquist | 700/236 |
| 2011/0180563 | A1 * | 7/2011 | Fitchett et al. | 222/1 |
| 2012/0138836 | A1 | 6/2012 | Kanai | |
| 2012/0211516 | A1 | 8/2012 | Zapp et al. | |
| 2012/0223096 | A1 | 9/2012 | Rudick | |

FOREIGN PATENT DOCUMENTS

| | | | |
|---|---|---|---|
| EP | 2091858 | B1 | 1/2011 |
| WO | 2008/055929 | A1 | 5/2008 |

OTHER PUBLICATIONS

U.S. Office Action dated Apr. 24, 2014 for U.S. Appl. No. 13/799,917, 8 pages.

International Search Report and Written Opinion for PCT/US2014/019930, mailing date Aug. 15, 2014, 12 pages.

* cited by examiner

COCKTAIL MODE

WIRELESS CONTROL SYSTEM FOR DISPENSING BEVERAGES FROM A BOTTLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to apparatus for dispensing a beverage from a container, and in particular to a computerized dispensing system that controls the amount of the beverage that flows from a bottle when a bartender pours a drink.

2. Description of the Related Art

A bartender commonly pours liquor from a bottle into a glass in which a drink is being served or mixed. A spout is often attached to the mouth of the bottle to dispense the liquor at a relatively constant flow rate so that a bartender can “free pour” the liquor without the need for a measuring device, such as a jigger. Even at a constant flow rate, the exact amount of liquor poured into each drink varies among different bartenders, and also varies from drink to drink poured by the same bartender. Such variation affects the profits derived from a given bottle of liquor; as well as affecting the taste, and as such the quality, of the drink. In addition, simple bottle spouts do not provide any mechanism to ensure that each drink dispensed from a bottle is rung up on the cash register. Thus, a bartender has been able to serve free or generous drinks to friends and preferred customers without accounting to the tavern management.

In response to these conditions, taverns and restaurants have installed computerized systems for dispensing liquor from bottles that control the quantity of liquid being dispensed to predefined portions and automatically report that quantity to a cash register. Such systems prevent the beverage server from pouring too much liquor without the system accounting for the additional amount. These systems ensure that customers are billed for the actual amounts of liquor being served, and that they are served the same high quality, good tasting drink every time.

One such system, described in U.S. Pat. No. 6,354,468, had a separate pour spout, with a magnetically operated valve, inserted into the mouth of each liquor bottle. When liquor was to be poured from a given bottle, the pour spout was placed inside an actuator ring connected to a computer via a cable. When the bottle and the ring were inverted, a tilt switch closed, causing an electromagnetic driver coil in the ring to be energized. The driver coil produced an electromagnetic field that opened the valve in the pour spout. The valve was held open for a defined period of time which dispensed a given volume of liquor because of a relatively constant flow rate through the pour spout. When that time period expired, the electromagnetic coil was de-energized by the computer and the valve closed.

That previous dispensing system also provided a mechanism for identifying the brand of the beverage that was being poured and to account for the total quantity of the beverage dispensed. This enabled the inventory of the bar to be determined automatically at any instant in time. The mechanism also calculates the dollar value of each drink being served so that the customer was charged the proper amount for the quantity of liquor in the drink served. For this purpose, a radio frequency identification (RFID) transponder was embedded in each pour spout. When the pour spout was inserted into the actuator ring, the RFID transponder was interrogated thereby sending an identification signal to an antenna in the actuator ring. The identification signal contained an identifier which was unique to that particular pour spout and thus to the specific brand of liquor. The identifier enabled the computer to determine the type of liquor being dispensed and thus the amount to charge for the drink being served.

Although such prior systems worked very well, they required that each bottle be placed into the actuator ring tethered to the computer by an electrical cable. This limited the area of the bar at which the drinks could be prepared and altered the normal manner in which the drinks were prepared and served. Thus a need exists for a dispensing system that controls and monitors the beverage dispensing in a less intrusive manner.

SUMMARY OF THE INVENTION

A system for dispensing a beverage from a bottle comprises a pour spout adapted to be attached to the bottle, a server interface adapted to be carried by a person who serves beverages, and a control unit for wirelessly communicating with the server interface. The pour spout includes a first transceiver for wireless communication, a controller connected to the first transceiver, and a valve operable by the controller for controlling flow of the beverage from the bottle in response to a first message received by the first transceiver. The server interface has a second transceiver for wirelessly transmitting the first message to the first transceiver and for wireless communication with the control unit.

In one dispensing mode, motion denoting a desire to dispense the beverage from the bottle is detected. In response to that motion, the pour spout wirelessly transmits a spout identifier to the server interface, which responds by wirelessly transmitting a request message to a stationary control unit. The request message contains a server identifier, which is unique to that server interface, and the spout identifier. The control unit responds to the request message by wirelessly transmitting to the server interface, a reply message authorizing beverage dispensing. The server interface reacts to the reply message by wirelessly transmitting a dispensing command to the pour spout. The dispensing command causes the pour spout to open its valve enabling the beverage to flow from the bottle.

In another dispensing mode, the person selects a cocktail via a user input device which causes a designation of a plurality of liquor ingredients for that cocktail to be retrieved from an electronic memory. The designation of the plurality of liquor ingredients is transmitted wirelessly from the control unit to the server interface carried by the person. Sequentially for each of the plurality of liquor ingredients, the server interface wirelessly transmits a dispensing command to a given pour spout attached to a bottle containing the respective liquor ingredient. Each pour spout in this case has a unique identifier that enables separate dispensing commands to be sent to each of different pour spouts. The given pour spout responds to the respective dispensing command by opening a valve through which the respective liquor ingredient flows from the bottle.

In one aspect of the present invention, the dispensing command designates a nominal pour time interval; and the pour spout opens the valve for a period of time that is derived from the nominal pour time interval. For example, the pour spout senses at least one of a temperature related to the beverage, a bottle tilt angle and a volume remaining in the bottle. That data is employed to derive an adjusted pour time interval from the nominal pour time interval. The valve then is opened for the adjusted pour time interval.

DETAILED DESCRIPTION OF THE INVENTION

Figure 1:
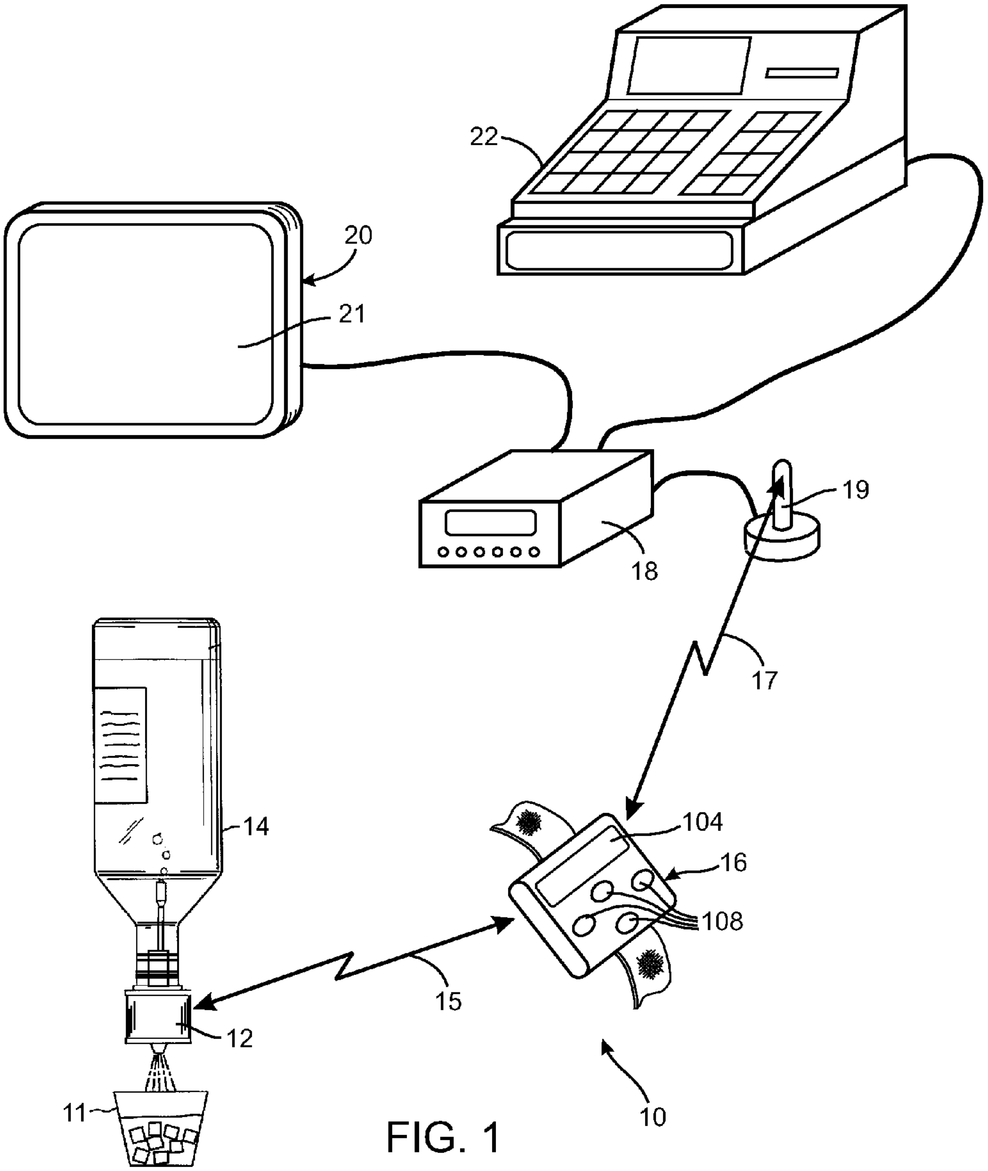
FIG. 1 is a diagram of a beverage dispensing system according to the present invention.

References herein to directional relationships and movement, such as top and bottom or left and right, refer to the relationship and movement of the components in the orientation illustrated in the drawings, which may not be the orientation of those components in all situations. The term “directly connected” as used herein means that the associated components are connected together by a conduit without any intervening element, such as a valve, an orifice or other device, which restricts or controls the flow of fluid beyond the inherent restriction of any conduit.

Dispensing System

With initial reference to FIG. 1, a beverage dispensing system 10 includes a pour spout 12 that is securely inserted into the neck of a bottle 14 that contains a beverage, such as liquor, to be dispensed. Although only one bottle and pour spout are shown, it should be understood that at a typical tavern, restaurant, or similar facility, there are a plurality of bottles, each having a similar pour spout. As will be described in greater detail, the pour spout 12 is controlled by messages received via a bidirectional first radio frequency link 15 from a server interface 16 that is carried by each person who is authorized to dispense beverages from the bottles. That person is referred to herein as a “beverage server” and the server interface 16 is used by the beverage server to dispense liquor from a bottle. The server interface 16 in the illustrated embodiment of the dispensing system 10 is shown in the form of a bracelet that has a wrist strap for fastening the device on the forearm of the beverage server. Nevertheless, other forms of the server interface, such as one that fits in a shirt pocket, may be provided which are adapted to enable the beverage server to carry the server interface while performing drink dispensing duties. The server interface 16 also communicates via a bidirectional second radio frequency link 17 with a control unit 18 that governs the dispensing of the beverages.

The computerized control unit 18 is physically similar to control computers used in previous beverage dispensing systems except that it communicates with the server interface 16, via an internal radio transceiver connected to an antenna 19, in order to dispense a beverage from the bottles 14. As will be described the control unit 18 executes unique software to perform functions of the present dispensing system 10. The control unit 18 is connected to a cocktail pad 20 by which the beverage servers select particular types of drinks to be served and the specific type of alcohol for each of the drinks. The cocktail pad 20 is a computer implemented device that stores a repertoire of cocktails and other mixed drinks along with the liquor ingredients for each cocktail and mixed drink. The cocktail pad 20 has a touch screen 21 by which a beverage server accesses the drink repertoire and selects a particular one to be served and is a commercially available device, such as one marketed by the Berg Company of Monona, Wis., U.S.A. The cocktail pad may be an integral part of the control unit 18. The control unit 18 also may be connected to a point of sale unit (e.g., a cash register) that is used to tabulate the price to be charged the customers being served and to collect their payment. The control unit 18 also may be connected by a computer network to a central computer that monitors the food and beverage service at the tavern or restaurant. It should be further understood that in a large establishment, there may be multiple beverage dispensing systems 10 connected together via that communication network or several control units 18 may be connected together by another communication network.

Figure 3:
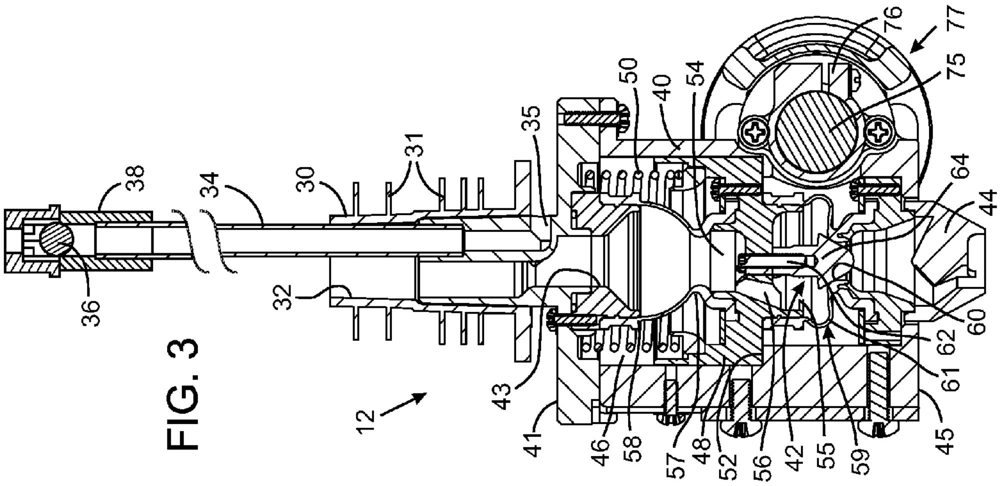
FIG. 3 is a transverse cross sectional view through the pour spout in a closed state.
Figure 2:
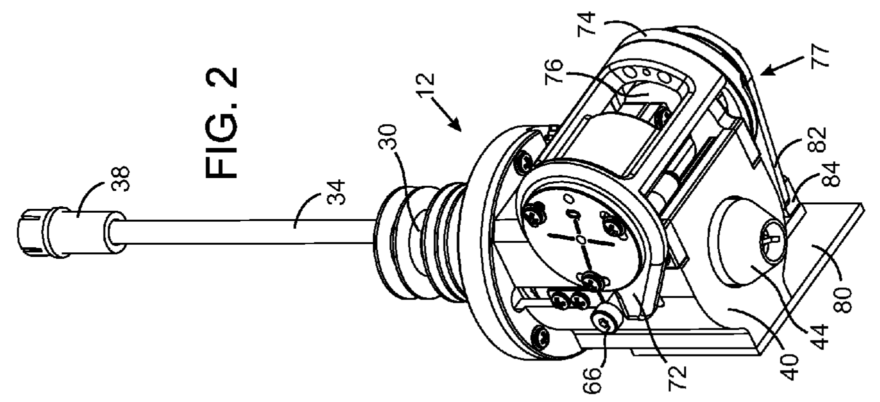
FIG. 2 is perspective view of a pour spout used in the beverage dispensing system.

FIGS. 2-3 illustrate the pour spout 12 with an outer enclosure removed so that the interior details of the device are visible. The pour spout 12 includes a bottle adapter 30 that when inserted into the neck of the bottle 14 makes a liquid tight seal that prevents liquid from escaping the bottle unless the pour spout is activated. The bottle adapter 30 may be made of plastic with rings 31 of different outer diameters to fit tightly into bottle necks of different sizes, however, the bottle adapter can have other configurations. The bottle adapter 30 has an inner beverage passage 32 through which the beverage in the bottle enters the pour spout. A breather tube 34 with an air inlet 35 allows air to flow into the bottle to replace the liquid which flows out through the pour spout 12. A ball 36 held within a cage 38 forms a check valve at the distal end of the breather tube 34 to prevent liquid from entering the breather tube.

A tamper-indicator, such as a heat shrink seal (not shown) may be placed around the pour spout 12 and the neck 13 of the bottle 12 to detect unauthorized attempts to remove the pour spout from the bottle. Alternatively, a sensor in the form of a mechanical switch, optical transmitter and reflector, bottle to pourer proximity sensor, or other mechanisms known the art could be used in indicating, logging, or communicating events of tampering with the integrity of the bottle to pourer bond. As a consequence, the only way to pour liquid from the bottle without providing indication to management of tampering is to use the dispensing system 10

The pour spout 12 has an interior housing 40 with a first side 41 to which the bottle adapter 30 is attached. That first side 41 has a housing inlet 43 through which liquid from the bottle is received from the inner beverage passage 32. The opposite second side 45 of the housing 40 has a nozzle 44 with a housing outlet 47 through which the beverage is dispensed from the pour spout 12. A spout valve 42 is provided within the housing 40 to control the flow of the beverage through the pour spout. The spout valve 42 is located in a chamber 46 within the housing 40 and comprises a valve carriage 48 that slides within the chamber toward and away from the housing inlet 43. A compression spring 50 biases the valve carriage 48 away from the housing inlet 43 and toward a stop 52 on the housing. The valve carriage 48 has a carriage inlet 54 and a carriage outlet 55, with a carriage flow passage 56 through which the beverage flows. A first tube 58 of a flexible, resilient material, such as silicone, has one end sealed in a secured manner to the housing 40 around the housing inlet 43 and another end sealed in a secured manner to valve carriage 48 through around carriage inlet 54. Thus the first tube 58 provides a first passageway for liquid to flow from the housing inlet 43 into the carriage inlet 54. The first tube 58 has at least one pleat 57 that allows the length of that tube to contract as the valve carriage 48 slides toward the housing inlet 43 while maintaining the first passageway open. A similar second tube 59 has one end sealed in a secured manner to the valve carriage 48 around the carriage outlet 55 and another end sealed in a secured manner to the housing around an opening of the housing outlet 47 in the outlet nozzle 44. Thus the second tube 59 to provides a second passageway for liquid to flow from the carriage outlet 55 into the outlet nozzle 44. The second tube 59 also is fabricated from a resilient material, such as silicone, and has at least one pleat 61 that allows the second tube to extend and contract lengthwise while maintaining the second passageway open.

An annular valve seat 60 is formed in the interior surface of the second tube 59 adjacent the end that is sealed to the outlet nozzle 44. The valve carriage 48 has a plunger 62 extending therefrom toward the outlet nozzle 44. The plunger 62 has an enlarged tapered head 64 that in the closed state of the pour spout 12, illustrated in FIGS. 3 and 4, engages the valve seat 60 to prevent liquid flow through the second tube. Note that in this closed state, the length of the second tube 59 is contracted because the valve carriage 48 is in a position that is proximate to the outlet nozzle 44. The compression spring 50 biases the valve carriage into that position thereby forcing the plunger 62 to abut the valve seat 60 and close the spout valve 42. Alternatively, the valve seat 60 could be located around the carriage passage 56 adjacent the carriage outlet 55 and the plunger could be affixed to the valve housing adjacent the outlet nozzle 44. These variations provide a valve seat in a flow path between the valve carriage 48 and the outlet nozzle 44 with the valve seat being engaged by a plunger to close the valve. As a further alternative, the valve seat and plunger could be provided between the valve carriage 48 and the inlet 43 of the housing on the opposite side of the valve carriage. Generically, a valve seat and closure plunger of the spout valve 42 are provided in the flow path through the housing 40 between the housing inlet 43 and the outlet nozzle 44.

Figure 4:
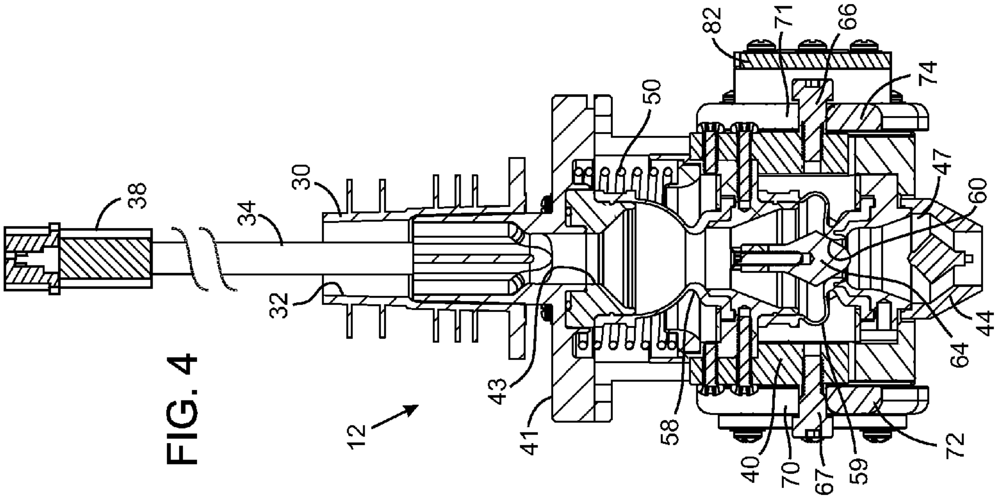
FIG. 4 is a transverse cross sectional view through the pour spout in a plane that is rotated 90° to the cross section plane of FIG. 3.
Figure 5:
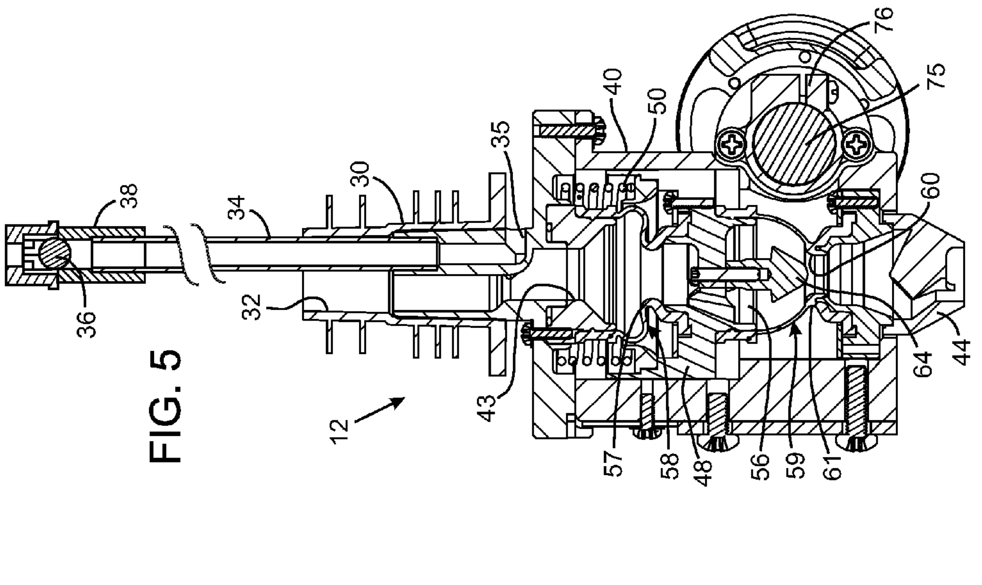
FIG. 5 is a transverse cross sectional view through the pour spout in an opened state.

With reference to FIG. 4, a pair elements 66 and 67, such as machine screws or molded posts, extend from opposite sides of the valve carriage 48 through vertical slots 70 and 71, respectively, in the housing 40. As the elements 66 and 67 travel in those slots 70 and 71, the valve carriage 48 moves within the housing chamber 46 toward and away from housing sides 41 and 45. With additional reference to FIG. 2, the elements 66 and 67 are engaged by a pair of cam plates 72 and 74, respectively. The two cam plates 72 and 74 are rotationally mounted to opposite ends of the shaft 75 of an electric motor 76. The electric motor 76 and the cam plates 72 and 74 form an electrically operated valve actuator 77. When energized, the motor 76 rotates the shaft 75 and thus the pair of cam plates 72 and 74. As will be described, that rotation pushes the two elements 66 and 67 within the slots 70 and 71, driving the valve carriage 48 against the force of the compression spring 50 and toward the first side 41 of housing 40. That valve carriage motion moves the plunger 62 away from engagement with the valve seat 60 thereby opening the pour spout valve 42. In that position of the valve carriage 48 illustrated in FIG. 5, the first tube 58 becomes longitudinally compressed while the second tube 59 is longitudinally extended. In the open state, liquid is able to flow from the bottle 14 through the beverage passage 32, the first tube 58, the valve carriage 48, the second tube 59 and the outlet nozzle 44 into a glass 11 or other container.

Other electrically activated mechanisms, than an electric motor, can be used as the valve actuator 77. For example, an external solenoid could have an armature that is mechanically coupled to the valve carriage, or the valve carriage can be made of a magnetically permeable material with an electromagnetic coil extending around the exterior of the housing 40 to create a magnetic field that moves the valve carriage 48. In addition, spouts with other types of valves may be use with the present dispensing system 10.

Referring again to FIG. 2, a printed circuit board 80 is attached to the housing 40 and contains an electronic circuit for operating the motor 76 and performing other functions of the pour spout 12 that will be described. A sensor lever 82 is attached to an exposed end of the motor shaft 75 and rotates with that shaft. The sensor lever 82 passes through an electro-optical sensor 84 that produces an electrical signal having two states indicating whether the pour spout valve 42 is opened or closed.

Figure 6:
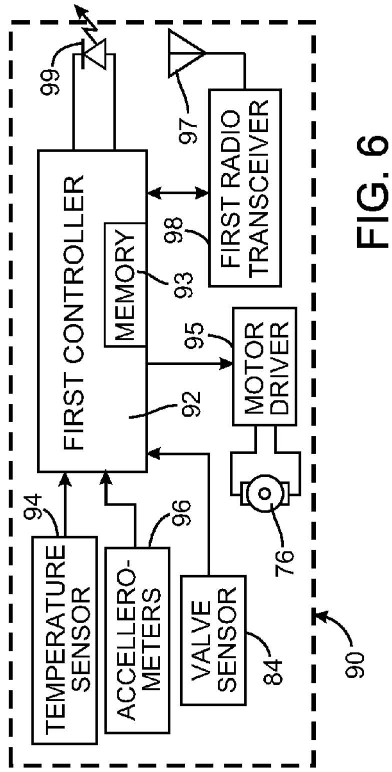
FIG. 6 is a block schematic diagram of a control circuit in the pour spout.

FIG. 6 schematically illustrates a pour spout control circuit 90 that is formed on the printed circuit board 80. The pour spout control circuit has a first controller 92, such as a microcomputer, that includes analog to digital converters, input/output circuits, and an internal memory 93 for storing a control program and data used by that program. The memory 93 stores a spout identifier that identifies the particular pour spout 12. The spout identifier may be simply a unique number assigned to the particular pour spout 12 and/or may identify the specific beverage in the bottle to which the particular pour spout is attached. As an example of a spout identifier, the memory 93 has one storage location that contains a designation of the brand of beverage and another storage location stores the particular type of beverage in the associated bottle. For example, the beverage brand may be "Johnnie Walker" and the type of beverage may be "Black Label Scotch Whiskey". The beverage brand and the type of beverage may be designated by alphanumeric characters or by numerical values assigned to the brand and beverage type. Another storage location within the pour spout memory 93 contains a designation of the volume capacity of the bottle, i.e., the quantity of beverage when the bottle is full. Another storage location within the pour spout memory 93 might contain the quantity of beverage dispensed since the pour spout was placed (programmed) onto the bottle. Alternatively, the spout identifier may simply be a numerical value assigned to that pour spout, in which case the control unit 18 stores a table which relates that numerical value to the brand, type of beverage, and volume capacity of the associated bottle.

Input circuits of the first controller 92 receive signals from a temperature sensor 94 and three accelerometers 96 that detect motion along three orthogonal axes of the pour spout 12. The signal from the valve position sensor 84 also is applied to an input of the first controller 92. An output of the first controller is connected to a motor driver 95 that controls the motor 76. Another output is coupled to a light emitter 99, such as a light emitting diode, to provide an indication to the beverage server when the dispensing system 10 has selected the associated bottle for use. An input/output circuit is connected to a radio transceiver 98 that has an antenna 97 for communicating with the server interface 16 (FIG. 1) as will be described. As used herein a radio transceiver is a device that includes a transmitter and a receiver.

A flow sensor could be incorporated to measure fluid flow through the pour spout and connected to the first controller 92. In this case the amount of liquor being dispensed would be the measured variable in a closed loop servo control with a setpoint being a derived time period defining the dispensed volume of beverage. In this closed loop servo system, servo control such a Proportional Integral Derivative (aka PID), or any subset of such could be employed by the first controller 92 to control opening and closing of the spout valve 42.

Figure 7:
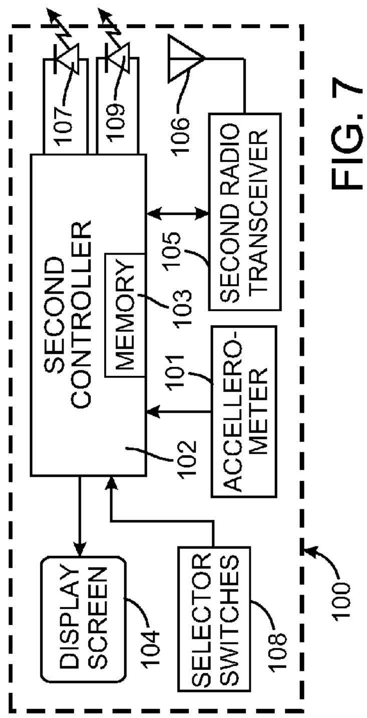
FIG. 7 is a block schematic diagram of a control circuit in a server interface that operates the pour spouts in a plurality of bottles

With reference to FIG. 7, the server interface 16 has an interface control circuit 100 comprising a second controller 102, such as a microcomputer, that has input/output circuits and an internal memory 103 for storing a control program and data used by that program. The memory 103 also stores a unique identifier, such as a number or a person's name, assigned to that particular server interface 16 which serves to identify the beverage server to whom the interface is assigned. That unique identifier is referred to herein as the "server identifier." The four selector switches 108 on the server interface 16 are used to designate a server selectable portion of the beverage to be dispensed. The buttons are used to select a small size portion, a regular size portion, a large size portion, or an extra large size portion. A nominal pour time interval during which the valve is to open for each of those portion sizes, may be stored in internal memory 103. By pressing several of the four selector switches 108 simultaneously, other functions of the server interface 16 can be can activated. At least one accelerometer 101 provides an input signal to the second controller to indicate when the beverage server rapidly moves the server interface 16. An output of the second controller 102 is connected to drive a conventional display 104, such as a liquid crystal display screen. A pair of light emitters 107 and 109, such as light emitting diodes, are connected to outputs of the second controller 102 to provide visual indications of different operating conditions. A second radio transceiver 105, with an antenna 106, is connected to an input/output circuit of the second controller 102. As shown in FIG. 1, the second radio transceiver 105 communicates with the pour spout 12 via the first radio frequency link 15 and with the control unit 18 via the second radio frequency link 17. This may be accomplished by using different radio frequencies for each link 15 or 17 or by sending different indicator codes in each transmitted message to designate whether the control unit 18 or a pour spout 12 in the intended message recipient. Instead of radio frequency links and radio transceivers other types of wireless communication signals, such as light beams, and transmission devices can be employed for wireless communication between various components of the beverage dispensing system.

Both the server interface 16 and the pour spout 12 are battery powered and may have a battery that is inductively rechargeable at a central recharging station in the tavern or restaurant. When the battery charge is below a certain level, the respective device produces a visual or audible indication of that state In each control circuit 90 and 100, the controller, radio transceiver, and other components may comprise a single integrated circuit, such as a model nRF51422 System on Chip (SoC) produced by Nordic Semiconductor ASA of Oslo, Norway. However other commerically available Radio Frequency Systems on a Chip (RF SOC) such as the Texas Instruments RF SoC family or Chipcon family, Analog Device ADuCRF family, Bluetooth 4 Low Energy (BLE) may be used.

Dispensing System Operation

The dispensing system 10 has two modes of operation—(1) a direct pour mode in which the beverage server picks up a beverage bottle and begins pouring a drink, and (2) a cocktail mode in which the beverage server selects the desired mixed drink on the cocktail pad 20 and is guided by the dispensing system 10 in selecting different liquor ingredients to use in preparing the mixed drink.

Figure 8:
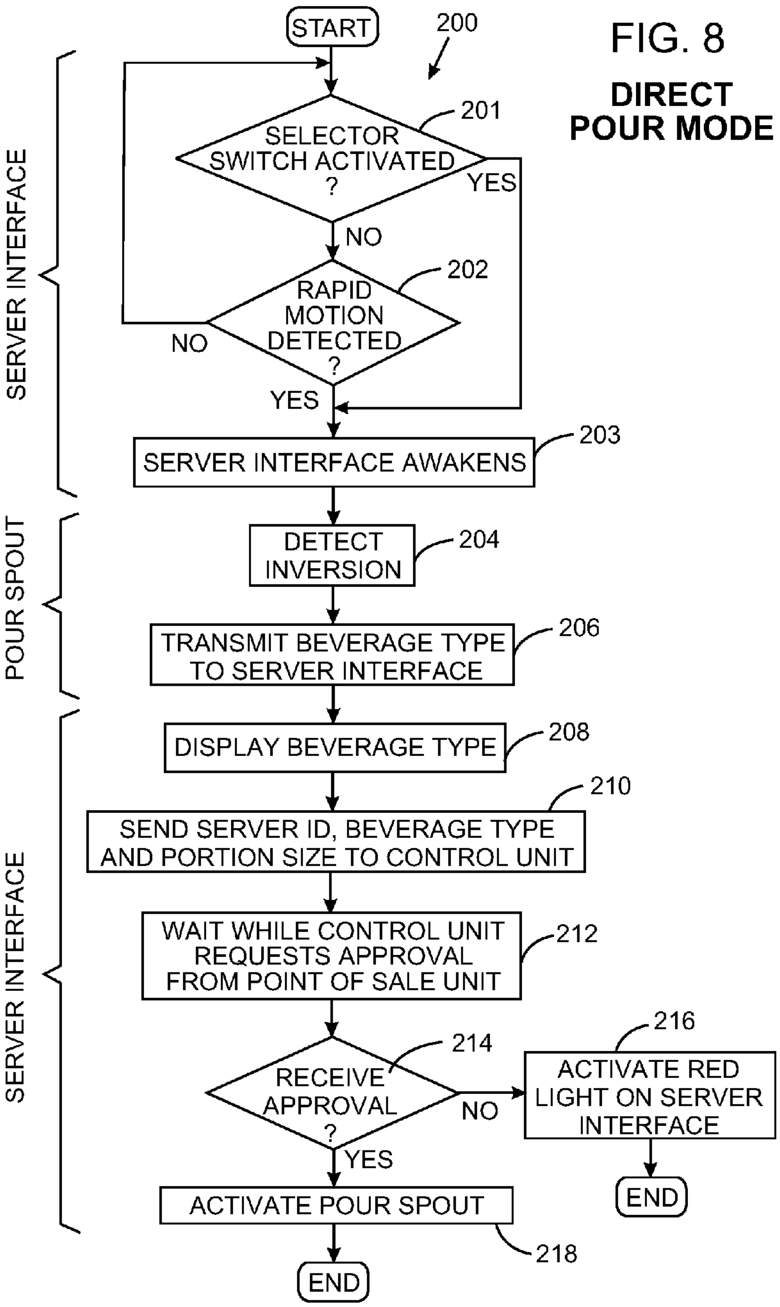
FIG. 8 is a flowchart of operation of the beverage dispensing system in a direct pour mode.

The direct pour mode 200 is depicted by the flow chart in FIG. 8 and will be described with additional reference to FIGS. 1, 6, and 7. The direct pour mode is initiated either by the beverage server pressing one of the drink size buttons 108 on the server interface 16 or by rapidly moving the server interface which is detected by the accelerometer 101. Either action wakes-up the server interface from a sleep state. Specifically, the software executed by the second controller 102 determines at step 201 whether one of the selector switches 108 has been depressed. The four selector switches 108 are used to denote whether a small, regular, large, or extra large size portion of the selected beverage is desired to be dispensed. If a switch activation is detected, the program advances to step 203 at which the server interface awakens and displays an indication of that event on the display 104. If one of the selector switches 108 was not depressed, the program advances from step 201 to step 202 at which the second controller 102 inspects the signal from the accelerometer 101. That accelerometer signal indicates whether the beverage server has rapidly moved the server interface 16 in order to awaken it. In that case, direct pour mode, defaults to the regular size portion and advances to step 203. If such rapid motion is not detected at step 202, the program execution returns to step 201 to continue in the sleep state.

Assuming that the beverage server has awakened the server interface 16 and the execution has advanced to step 203, the beverage server then grabs the particular bottle 14 containing the beverage that is desired to be dispensed. That bottle then is inverted the bottle over the glass 11 or other container. The inversion of the bottle 14 is detected by the three accelerometers 96 in the spout 12, thereby providing signals indicating that event to the first controller 92 in FIG. 6. The first controller 92 responds by transmitting a pour request message via the first radio frequency link 15 at step 206. That request messages contains the spout identifier retrieved from pour spout memory 93.

At step 208, upon receiving the pour request message, the server interface 16 extracts the name of the beverage from that message and presents the name on the display 104. Then at step 210, the second controller 102 accesses its memory 103 to obtain the server identifier for the person to whom the respective server interface 16 has been assigned. That server identifier, the spout identifier, and the desired portion size are transmitted as a beverage dispensing request via the second radio frequency link 17 to the control unit 18. Thereafter, the software executed on the server interface 16 waits at step 212 for a response from the control unit 18 authorizing the dispensing of that particular beverage.

The receipt of the dispensing request causes the control unit 18 to obtain the price that has been stored in the control unit's memory for the specified portion size of the designated beverage. The server identifier, type and portion size of the beverage, and the related price are then transmitted to the point of sale unit 22 for entry into the bill for the items being served to the associated customer. This information may be encoded in what is commonly referred to as a price look-up (PLU) number. It should be understood that upon serving all the drinks ordered by that customer, the beverage server will print the bill at the point of sale unit 22. After the transaction has been entered, the point of sale unit 22 approves the dispensing transaction by sending an approval message to the control unit 18. In response to the approval message, the control unit 18 sends a request reply message via the second radio frequency link 17 to the server interface 16 which in effect approves the beverage dispensing request.

If a predefined amount of time after sending a beverage dispensing request, the server interface 16 has not received a request reply message from the control unit 18, the direct pour mode branches from step 214 to step 216. Alternatively, the server interface 16 may receive reply message from the control unit 18 that expressly denies the beverage dispensing request. In either event, the server interface 16 concludes that the beverage dispensing was not approved. The second controller 102 activates the red light emitter 107 to indicate to the beverage server that the transaction has been denied. An alphanumeric message to that effect also may be presented on the display 104 of the server interface 16. The server interface display may be backlit to different selectable colors or the server interface 16 may have a vibrating motor, that are operated to indicate the denial to the person carrying the server interface. Those indications remain active for a predefined period of time after which the direct pour mode 200 terminates without dispensing any beverage from the bottle 14.

Otherwise upon receiving a request reply message from the control unit 18 at step 214, the direct pour mode advances to step 218 at which the server interface 16 sends a dispensing command message via the second radio transceiver 105 to the respective pour spout 12. That dispensing command message contains the spout identifier which was previously received by the server interface from the associated pour spout 12. The spout identifier indicates which pour spout at the serving station is to be activated and thus which pour spout is to receive and respond to this pour command message.

Various beverages have different viscosities, for example, gin and whiskey have a viscosity similar to that of water, while certain liqueurs have a greater viscosity and pour slower. Thus different beverages have different nominal pour time intervals during which to open the pour spout valve 42 in order to dispense the desired portion size of that beverage. The appropriate nominal pour time intervals related to each portion size for a particular beverage may be stored either in memory 93 of the associated pour spout 12 or in the beverage data table stored in the control unit 18, that also stores the price data for that beverage. In the latter case, the nominal pour time interval to use is sent from the control unit 18 to the server interface 16 in the request reply message and then relayed to the pour spout 12 in the dispensing command message. It also may be feasible to store the nominal pour time intervals in a table in the server interface 16, if its memory 103 has sufficient storage capacity.

Those pour time intervals are noted as being "nominal" because the rate at which the beverage flows from the bottle is a factor of the beverage temperature, the angle at which the beverage server inverts the bottle and the quantity of liquor remaining in the bottle. For some mixed drinks, a liquor ingredient, such as gin, may be refrigerated and thus be at a lower temperature than another bottle of the identical brand of gin that is not refrigerated for other types of drinks. Thus, the control circuit 90 for the pour spout 12 has a temperature sensor 94 that enables the first controller 92 to know the present temperature of the beverage. A first lookup table stored within memory 93 provides data defining how the pour time interval for the respective beverage is affected by temperature, thereby enabling the first controller to adjust the nominal pour time for temperature variation. The accelerometers 96 also enable the first controller 92 to determine the angle to which the beverage server has tilted the bottle for pouring. When the bottle is aligned vertically, the beverage flows from the pour spout 12 at a faster rate than when the bottle merely is tilted to a 45° angle with respect to vertical. A second lookup table stored within memory 93 provides data defining how the pour time interval for the respective beverage is affected by the bottle tilt angle, thereby enabling the first controller 92 to adjust the nominal pour time for tilt angle variation. The quantity of beverage remaining in the bottle also affects the actual pour time, i.e., the greater the quantity, the greater the fluid pressure and thus the greater the flow rate. Therefore, the first controller 92 uses the amount of beverage dispensed during each pour to track the quantity remaining in the bottle. A third lookup table within memory 93 provides data defining how the pour time interval is affected by the quantity of the beverage remaining in the bottle, thereby enabling the first controller 92 further to adjust the nominal pour time. The result of this processing is an adjusted pour time interval.

Thereafter the first controller 92 produces an output signal which activates the motor driver 95 which responds by energizing the motor 76 to rotate the cam plates 72 and 74 in FIGS. 2 and 4. The cam plates 72 and 74 push the valve carriage elements 66 and 67, thereby sliding in the valve carriage 48 within the housing 40. The motion of the valve carriage 48 moves the plunger 62 away from the valve seat 60 opening a path for the beverage to flow from the bottle out of the nozzle 44 and into the glass 11 or other container. The motor is de-energized when the valve is fully open to save battery power. The motor 76 and its gearbox provide sufficient resistance to hold the spout valve 42 open against the force of the compression spring 50. The first controller 92 has an internal timer that measures the amount of time during which the spout valve 42 is open and when the adjusted pour time interval expires, the motor 76 is reversed in direction. At that time, the compression spring 50 moves the valve carriage 48 until the plunger 62 once again engages the valve seat 60 closing the fluid path through the pour spout 12, terminating the flow of the beverage from the bottle 14. The motor is de-energized when the valve is fully closed to save battery power.

On some occasions, the beverage server may make two or more identical drinks at the same time. In that situation, the beverage server, while holding the bottle 14 in the inverted position, shakes the bottle up and down rapidly which motion is detected by the accelerometers 96 in the pour spout 12. That rapid movement triggers the first controller 92 to send another dispensing request to the server interface 16. This causes in the direct pour mode to repeat starting with step 206. Eventually the direct pour mode 200 terminates with the beverage server placing the bottle in the normal upright position.

Figure 9:
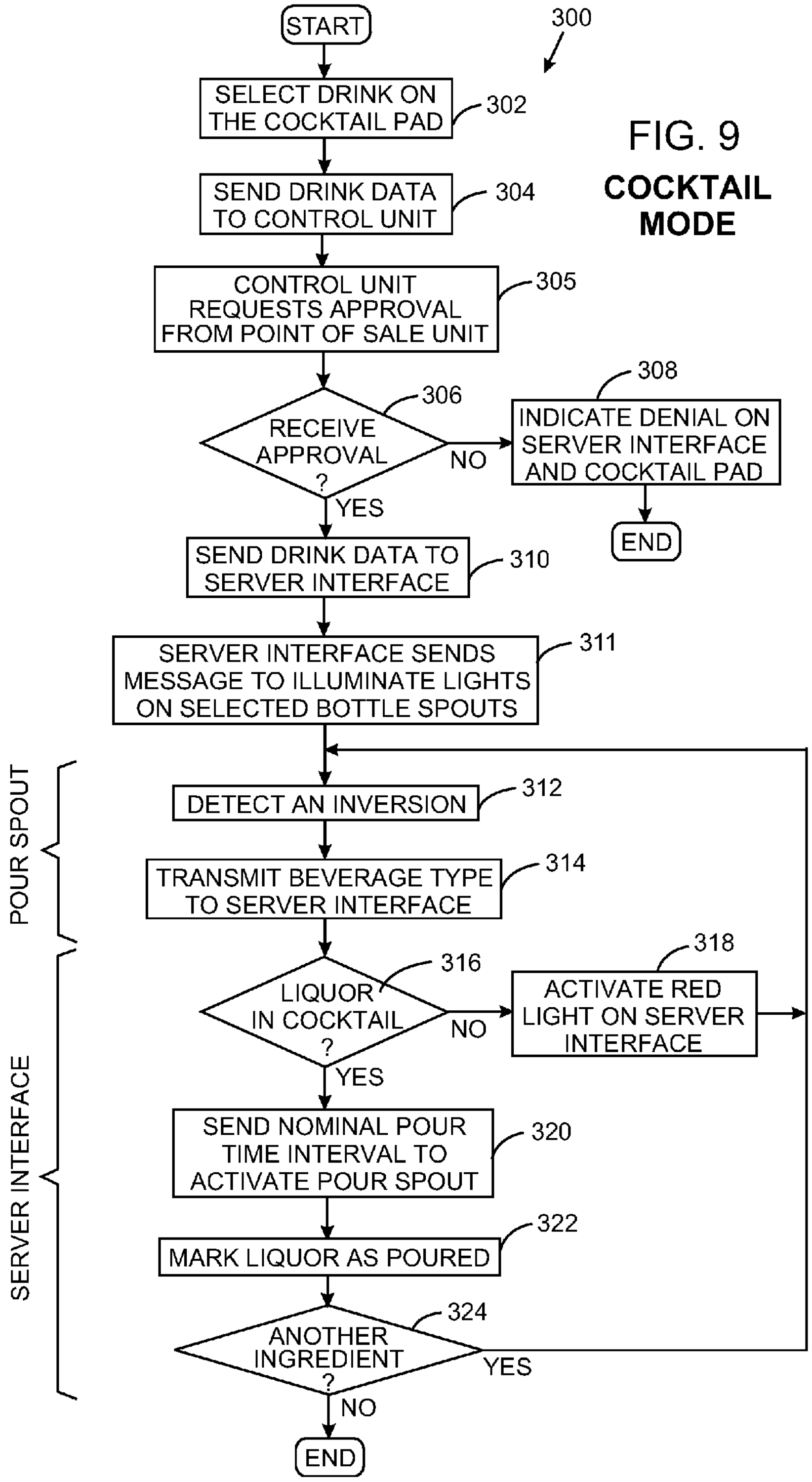
FIG. 9 is a flowchart of operation of the beverage dispensing system in a cocktail mode.

With reference to FIG. 9, the dispensing system 10 in the cocktail mode 300 guides the beverage server through mixing several liquor ingredients to make a particular cocktail. To mix a drink in this mode, the beverage server selects the desired mixed drink or cocktail from a list presented on the touch screen 21 cocktail pad 20. The cocktail mode commences with the beverage server signing into the cocktail pad 20, either by entering an employee number or selecting that person's name from a list displayed on the touch screen 21. Then the beverage server uses the touch screen 21 to scan the list of cocktails until locating the one that is desired at step 302. Typically the cocktail mode 300 is used to prepare drinks that have a number of different liquor ingredients, for example, a Long Island Iced Tea contains vodka, tequila, rum, gin, triple sec along with sweet and sour mix and a splash of cola.

A drink selection message, containing the beverage server's identifier, the name of the selected cocktail, the list of ingredients in that cocktail, and a nominal pour time interval for each ingredient is communicated from the cocktail pad 20 to the control unit 18 at step 304. Upon receiving that message, the control unit looks up the price of the cocktail in a table stored in its memory. The control unit 18 then sends transaction notice message containing the beverage server identifier, the cocktail name, and the price to the point of sale unit 22. The point of sale unit 22 adds that cocktail to a list of items on the bill for the customer being served. Thereafter, a reply message, which effectively authorizes the dispensing transaction, is sent back to the control unit 18.

Otherwise, if reply message is not received within a predefined amount of time after sending the transaction notice message, the control unit 18 concludes that the transaction has been denied and the cocktail mode branches to step 308. Alternatively, the control unit 18 may receive reply message from the point of sale unit 22 that expressly denies the beverage dispensing transaction. In either event, an indication of the denial is sent to and displayed on the cocktail pad 20 and the server interface 16 for the respective beverage server, before the cocktail mode ends.

Upon receiving an approval reply message from the point of sale unit 22, the cocktail mode branches from step 306 to step 310 at which the control unit 18 uses the server identifier to send a transaction message, via the second radio frequency link 17, to the server interface 16 that is assigned to the requesting beverage server. The transaction message contains the identity of the cocktail to be prepared, the list of liquor ingredients, and for each ingredient, both the spout identifier and designation of the nominal pour time interval. When the server interface 16 receives a message containing the associated server identifier and an approval code for the cocktail mode, the data contained in that message is extracted and stored in the memory 103. At step 311, the server interface 16 sends a message to the pour spout 12 for each bottle 14 containing one of the liquor ingredients. Each of those messages, sent via the first radio frequency link 15, instructs the control circuit 90 in the respective spout to activate its light emitter 99 which visually identifies the associated liquor bottle among all the bottles at the serving station.

Next at step 312, the cocktail mode waits for the server to grab one of the liquor bottles on the ingredient list. The server inverting that bottle is detected by the accelerometers 96 in the attached pour spout 12 and that causes the first controller 92 in the pour spout to send a wireless message to the server interface 16 at step 314. That message identifies the pour spout 12 and its liquor bottle to the server interface 16.

Then at step 316, the server interface 16 checks whether the liquor in the identified bottle is on the list of ingredients for the cocktail being mixed. If not, the process branches to step 318 at which a red light emitter on the server interface is illuminated to indicate selection of an incorrect bottle by the server. The process then returns to step 312 to await selection of a proper bottle. If at step 316, the identified bottle was found to contain a liquor ingredient of the cocktail, the process branches to step 320. At that time, an activation message containing the nominal pour time interval for that liquor ingredient is sent wirelessly to the inverted pour spout 12.

The designated pour spout 12 receives that activation message. As described previously with respect to the direct pour mode, the pour spout control circuit 90 also senses the temperature of the beverage and the angle at which the bottle has been tilted. The pour spout control circuit 90 also keeps track of the quantity of liquor remaining in the bottle. Those three variable factors affect the rate at which fluid flows through the pour spout and the first controller 92 uses the sensed temperature, the tilt angle and the remaining liquor quantity to adjust the nominal pour time interval to ensure that the proper quantity of beverage is dispensed under those variable conditions. That action produces an adjusted pour time interval.

The first controller 92 then operates the motor 76 to open the spout valve 42 and begins measuring the amount of time that the spout valve is held open. When that amount of time equals the adjusted pour time interval, the motor 76 is activated to close the valve. The first controller 92 then deactivates the light emitter 99 on the pour spout. The closure of the spout valve 42 is communicated by the first radio transceiver 98 via the first radio frequency link 15 to the server interface 16.

Next at step 322, the server interface 16 marks the liquor ingredient as having been poured. The server interface 16 checks the cocktail ingredient list to determine if another ingredient remains to be poured, at step 324. If there is another such ingredient, the cocktail mode returns to step 312 where the process waits for the server to grab and invert another liquor bottle on the ingredient list for the selected cocktail. The process repeatedly loops through steps 312-324 until all the liquor ingredients have been poured to prepare the mixed drink, at which time the cocktail mode ends at step 326.

For certain cocktails, such as the Long Island Iced Tea, non-alcoholic beverages such as a carbonated soda or an ingredient that is not contained in a bottle may be utilized. The beverage dispensing system 10 can indicate those additional ingredients either via the cocktail pad 20 or the display 104 on the server interface 16.

The cocktail mode 300 has been described in the context of the list of liquor ingredients and designations of the nominal pour time interval for each ingredient of the selected mixed drink being transmitted to the server interface 16 in a single message from the control unit 18. The server interface 16 the controls the sequential activation of each of the pour spouts 12 for the liquor ingredients. Alternatively, the control unit 18 can control dispensing each liquor ingredient and send separate dispensing messages to the server interface 16 for each liquor ingredient sequentially as each ingredient has been dispensed. Each such dispensing message contains the spout identifier associated with one liquor ingredient and the designation of the nominal pour time interval for that liquor ingredient.

The valves in previous beverage dispensing spouts sometimes became stuck shut when used to dispense a relatively sticky beverage, such as a cordial that is served infrequently. The present dispensing system 10 mitigates this problem by periodically exercising the spout valve 42 even though beverage is not sought to be dispensed. The control unit 18 stores list of spout identifiers for pour spouts that are susceptible to valve sticking. Periodically, such as once a week, the control unit 18 enters a valve exercise mode in which each of those spout identifiers is sequentially obtained from that list and used to send an exercise command either directly to the associated pour spout 12 or to the pour spout via a server interface 16 that is in use. Upon receiving the exercise command, the first controller 92 of the respective spout control circuit 90 determines the present attitude of the bottle, as stored previously based on signals from the accelerometers 96. If the bottle is in the upright position, i.e., the neck facing upward, the first controller 92 commands the motor driver 95 to energize the motor 76 and open the valve for a brief period of time, e.g., a fraction of a second.

The foregoing description was primarily directed to one or more embodiments of the invention. Although some attention has be given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A system for dispensing a beverage from a bottle comprising:

a pour spout adapted to be attached to the bottle and having a first transceiver for wireless communication, a first controller connected to the first transceiver, and a valve operated by the first controller to control flow of the beverage from the bottle through the spout in response to a first message received by the first transceiver;

a server interlace adapted to be carried by a person who serves the beverage and comprising a display screen and a second transceiver for wirelessly transmitting the first message: and a control unit for wirelessly communicating with the second transceiver of the server interface, wherein the control unit sends a second message to the server interface which responds by transmitting the first message to the pour spout.

2. The system as recited in claim 1 wherein the server interface includes a second controller and one or more selectable inputs for the beverage server to select by actuation.

3. The system as recited in claim 1 wherein the pour spout stores a spout identifier, and the spout identifier is communicated to the server interface in response to at least one of a) the actuation of a button on the server interface, and b) detection by the server interface of a rapid movement of the server inerface.

4. The system as recited in claim 3 wherein upon receiving a spout identifier, the server interface communicates the spout identifier to the control unit.

5. The system as recited in claim 4 wherein upon receiving a spout identifier, the control unit sends the server interface a reply message authorizing beverage dispensing, and the server interface responds to the reply message by sending a dispensing command to the pour spout.

6. The system as recited in claim 1 wherein the server interlace comprises at least one of a display that is backlit to a plurality of selectable colors and a vibrating motor, which is operable to provide indications to a person carrying the server interface.

7. The system as recited in claim 1 wherein the server interface comprises an input device by which the person designates an amount of the beverage that is desired to be dispensed, thereby producing a portion size indication.

8. The system as recited in claim 7 wherein the server interface communicates the portion size indication to the control unit.

9. The system as recited in claim 7 wherein the portion size indication is used to derive a pour time interval that defines an amount of time that the pour spout is to open the valve.

10. The system as recited in claim 1 wherein the server interface stores a server identifier that identities the person, and wherein the server interface communicates the spout identifier to the control unit in response to initiating a beverage dispensing operation.

* * * * *